United States Patent
Noguchi

Patent Number: 6,157,790
Date of Patent: Dec. 5, 2000

[54] IMAGE FORMATION PARAMETER CORRECTION APPARATUS

[75] Inventor: Kazuyoshi Noguchi, Toyokawa, Japan

[73] Assignee: Minolta Co., Ltd., Osaka, Japan

[21] Appl. No.: 09/176,723

[22] Filed: Oct. 21, 1998

[30] Foreign Application Priority Data

Oct. 22, 1997 [JP] Japan ................................. 9-289963

[51] Int. Cl.[7] .............................................. G03G 15/00
[52] U.S. Cl. ................................................. 399/15; 399/8
[58] Field of Search .................................. 399/1, 8, 9, 11, 399/15, 38

[56] References Cited

U.S. PATENT DOCUMENTS

| | | | |
|---|---|---|---|
| 4,167,322 | 9/1979 | Yano et al. | 399/11 X |
| 5,057,866 | 10/1991 | Hill, Jr. et al. | 399/8 |
| 5,361,265 | 11/1994 | Weinberger et al. | 399/8 X |
| 5,365,310 | 11/1994 | Jenkins et al. | 399/8 |
| 5,510,896 | 4/1996 | Wafler | 399/15 X |
| 5,649,120 | 7/1997 | Motoyama | 399/8 X |
| 5,884,118 | 3/1999 | Mestha et al. | 399/15 |

Primary Examiner—Sandra Brase
Attorney, Agent, or Firm—McDermott, Will & Emery

[57] ABSTRACT

A method and apparatus for correcting image parameters for each of several image forming apparatuses networked together are provided. In the present method and apparatus, one device, which can be one of the networked image forming apparatuses, operates as an image parameter correction apparatus. The image parameter correction apparatus reads in a prescribed image formed by each image forming apparatus, and calculates image parameter correction values for each image forming apparatus. The image parameter correction values for each image forming apparatus are calculated by comparing image parameters for the corresponding scanned prescribed image with reference image parameters. The image parameter correction values for each image forming apparatus are then transmitted to the corresponding image forming apparatus. In the case where one of the networked image forming apparatuses serves as the image parameter correction apparatus, that apparatus also forms a prescribed image, and derives the reference image parameters from its own prescribed image, which is scanned in along with the prescribed images formed by the other image forming apparatuses.

11 Claims, 5 Drawing Sheets

IMAGE FORMATION PARAMETER CORRECTION APPARATUS

This application is based on Japanese Patent Application No. 09-289963 Pat., filed in Japan on Oct. 22, 1997, the content of which is incorporated herein by reference.

FIELD OF THE INVENTION

The present invention relates to an image formation parameter correction apparatus, and more particularly to an image formation parameter correction apparatus for correcting image formation parameters that control the image formation process in an image forming apparatus.

BACKGROUND OF THE INVENTION

Japanese Examined Patent Publication No. 7-118756, for example, discloses an image formation parameter correction apparatus of the general type that is the subject matter of the present application. This Japanese publication teaches a color image forming apparatus that reads in a prescribed color test pattern via a scanner, and corrects image formation parameters such as color registration, thereby preventing color mis-registration or the like.

In today's widespread distributed processing networks, network configurations with a plurality of image forming apparatuses are not uncommon. In such configurations, consistency in image quality from one image forming apparatus to the next is desired.

In the prior art, however, correction operations such as that referenced above in Japanese Examined Publication No. 7-118756 must be performed for each individual image forming apparatus, and performing such correction operations on each apparatus is time consuming. In particular, because of inherent variations among the respective image forming apparatuses (i.e., variations in the image scanning sensors), reading the same test pattern into each apparatus results in image quality variations in the scanned test pattern, which prevents uniform adjustment of the image formation parameters.

It is therefore an object of the present invention to provide an image formation parameter correction apparatus that facilitates uniform adjustment of image quality between a plurality of image forming apparatuses.

SUMMARY OF THE INVENTION

The present invention achieves the foregoing object by providing an image formation parameter correction apparatus capable of correcting image formation parameters that comprises an image reading section, a correction value calculating means, and a correction information output section. The image reading section reads a prescribed image formed by each of a plurality of image forming apparatuses. The correction value calculating means calculates correction values for the image formation parameters on the basis of the prescribed image read by the image reading section. The correction values being necessary to accomplish quality consistency between images formed by the plurality of image forming apparatuses. Based on the correction values, the correction information output section outputs, to each image forming apparatus, information for correcting the image formation parameters in each respective image forming apparatus. Therefore, by correcting the image parameters in each image forming apparatus based on the output information, quality consistency is achieved between the images formed by the plurality of image forming apparatuses.

The present invention further provides an image formation parameter correction apparatus that further comprises an image forming means capable of functioning as one of the plurality of image forming apparatuses. In this further image formation parameter correction apparatus, the correction value calculating means calculates the correction values necessary to correct the image formation parameters for the image forming apparatuses based on the image quality of the prescribed image formed by the image forming means within the image formation parameter correction apparatus. The quality of images formed by the image forming apparatuses is thereby corrected so that it is consistent with the quality of the image formed by the image formation parameter correction apparatus itself.

DETAILED DESCRIPTION OF THE PREFERRED EMBODIMENTS

An image formation parameter correction apparatus in accordance with the present invention is described below with reference to drawings.

Figure 1:
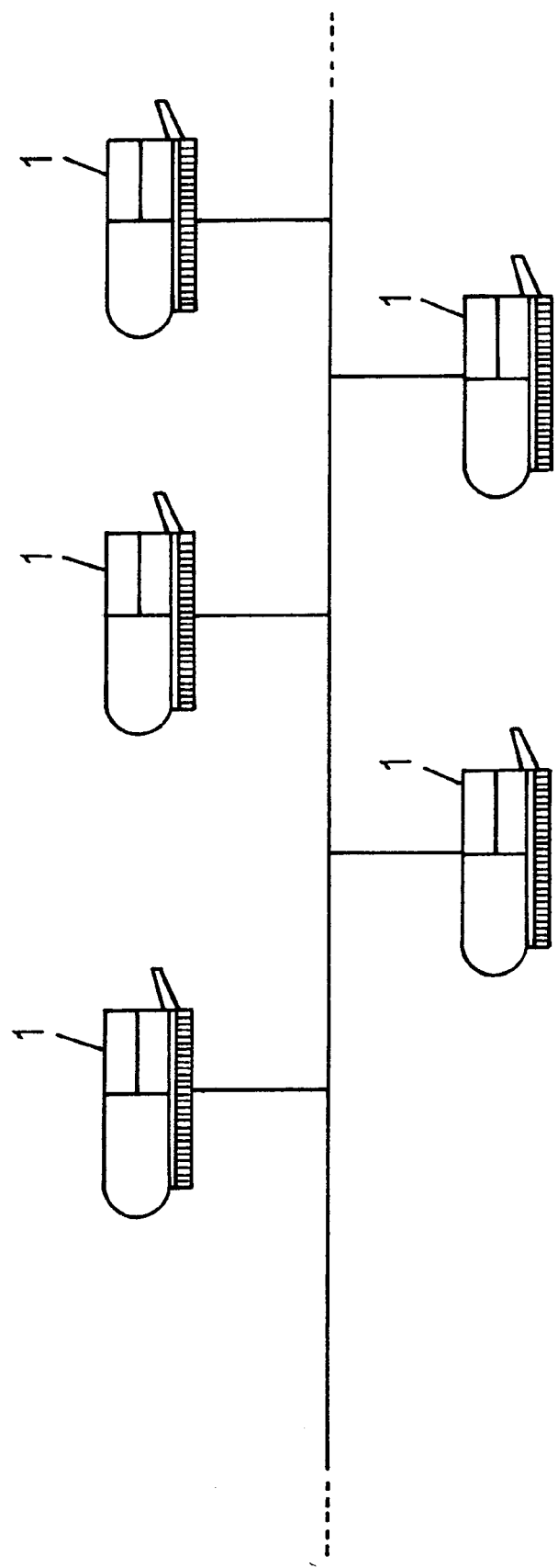
FIG. 1 is a diagram showing a network configuration comprising a plurality of image forming apparatuses.

FIG. 1 is a diagram showing a network configuration for the connection of a plurality of image forming apparatuses 1. As shown, a plurality of image forming apparatuses 1 are installed, for example, within a local area network (LAN). Though not shown here, in addition to the image forming apparatuses 1, personal computers and a server, which send image output information to the image forming apparatuses 1, are also connected in the LAN.

Each image forming apparatus 1 functions as a printer to generate characters, symbols, graphics, and other required images based on the image output information (i.e., image information sent from the personal computers), and to record and output the generated images onto recording paper. The image forming apparatus 1 includes a document table on which a document is placed, and a scanner for reading images from the document placed on the table. The image forming apparatus 1 further functions as a copying machine to internally generate the images read by the scanner and to record them on recording paper.

Figure 2:
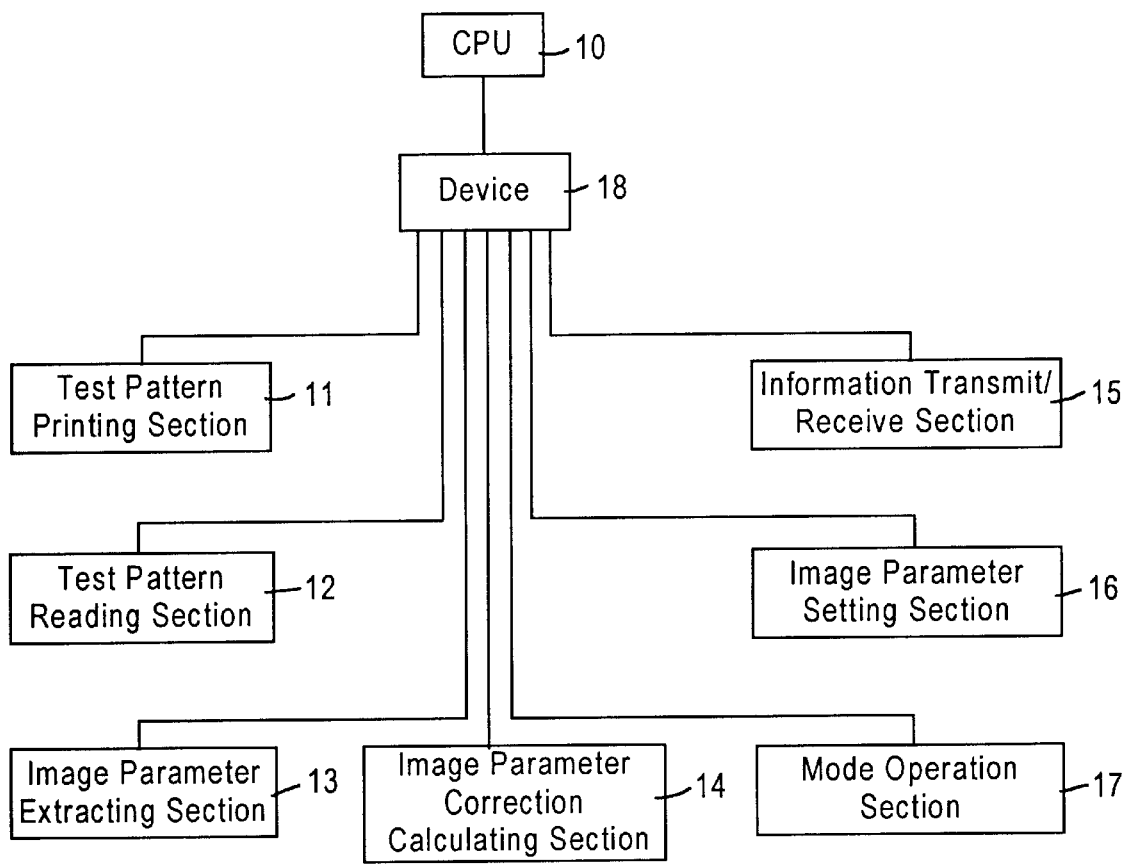
FIG. 2 is a block diagram showing the configuration of a control block of an image forming apparatus of FIG. 1.

FIG. 2 is a block diagram showing the configuration of a controller of the image forming apparatuses of FIG. 1. The controller includes a CPU 10, a test pattern printing section 11, a test pattern reading section 12, an image parameter extracting section 13, an image parameter correction value calculating section 14, an information transmit/receive section 15, an image parameter setting section 16, a mode operation section 17, and a device 18.

The test pattern printing section receives a test pattern print command, and prints a test pattern, along with a machine code identifying the particular apparatus from which the test pattern originated, on recording paper. The test pattern reading section 12 includes a scanner, which is capable of reading test pattern and machine code information from a printed test pattern. The image parameter extracting section 13 extracts image parameters (i.e., image density, main-scan print starting position, sub-scan print starting position, etc.) from each of the test patterns scanned by the test pattern reading section 12. The image parameter correction value calculating section 14 compares the image parameter values extracted from the other image forming apparatus 1 with correction reference values, and calculates corresponding correction values for the image parameters of each of the other image forming apparatuses 1. The information transmit/receive section 15 receives and transmits information. The image parameter setting section 16, under the control of the CPU 10, sets internal image parameter values in accordance with received correction values.

Figure 3:
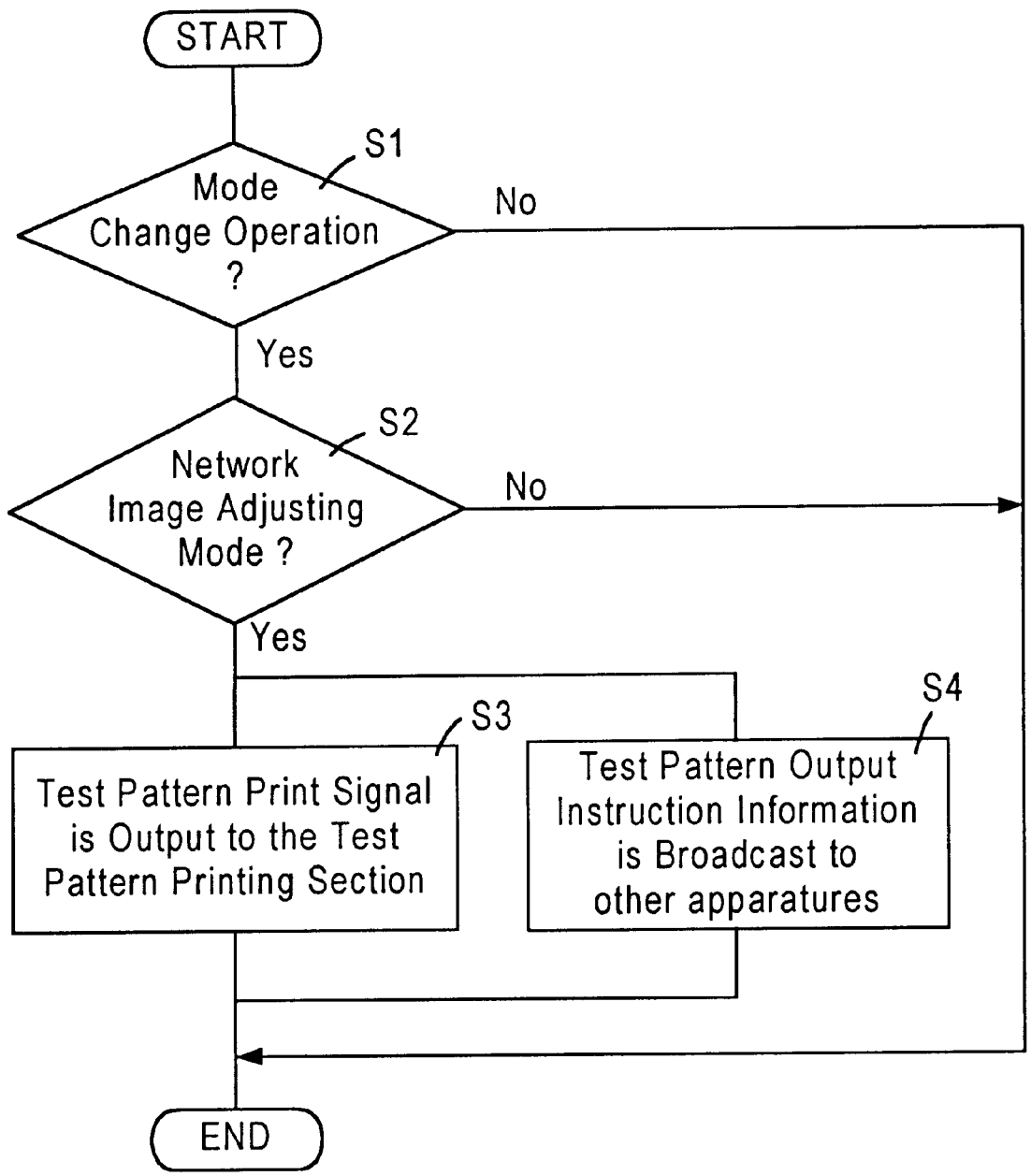
FIG. 3 is a flowchart illustrating mode change and test pattern print signal generation operations of an image forming apparatus of FIG. 1.
Figure 4:
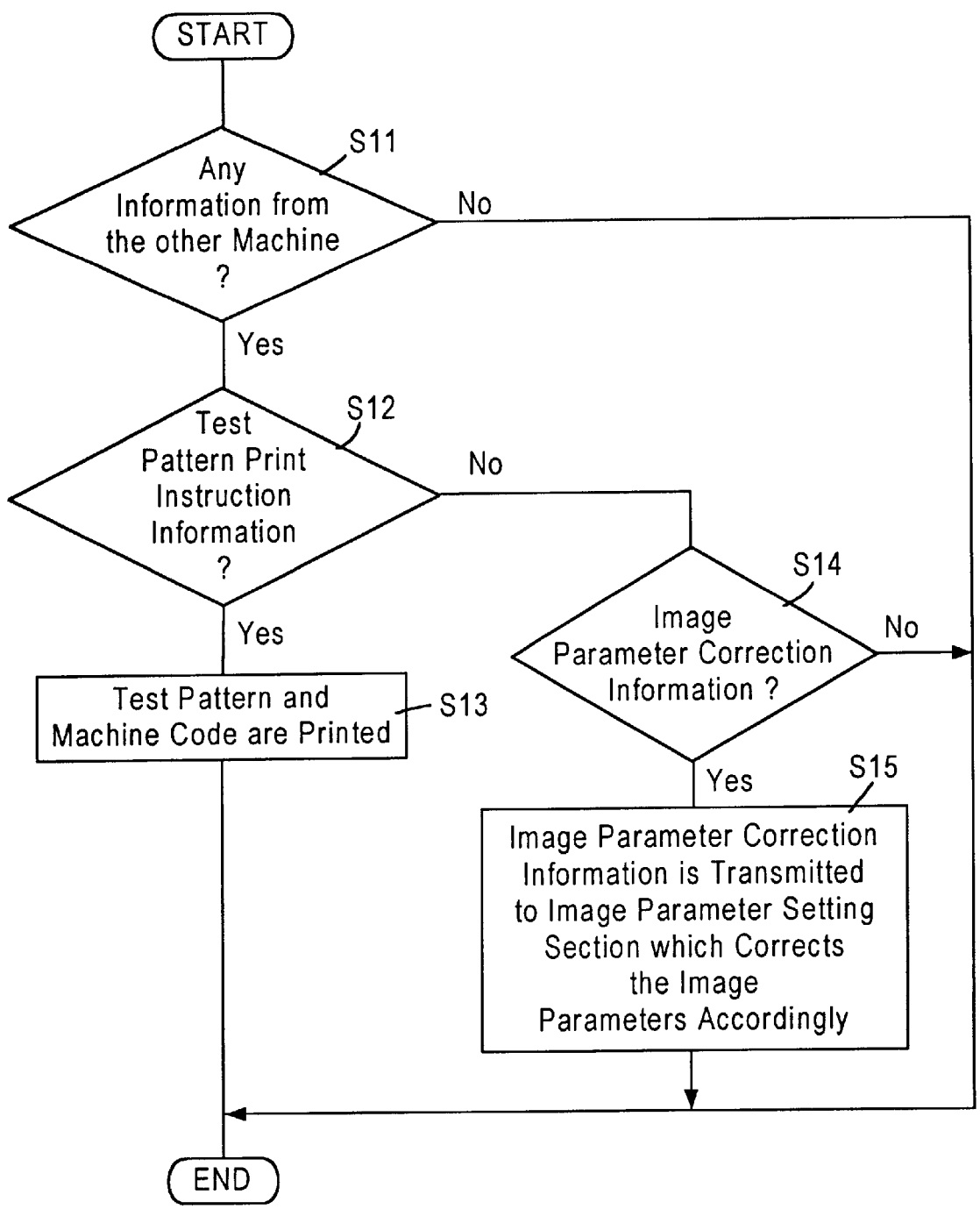
FIG. 4 is a flowchart illustrating test pattern print and image parameter correction operations of an image forming apparatus of FIG. 1.
Figure 5:
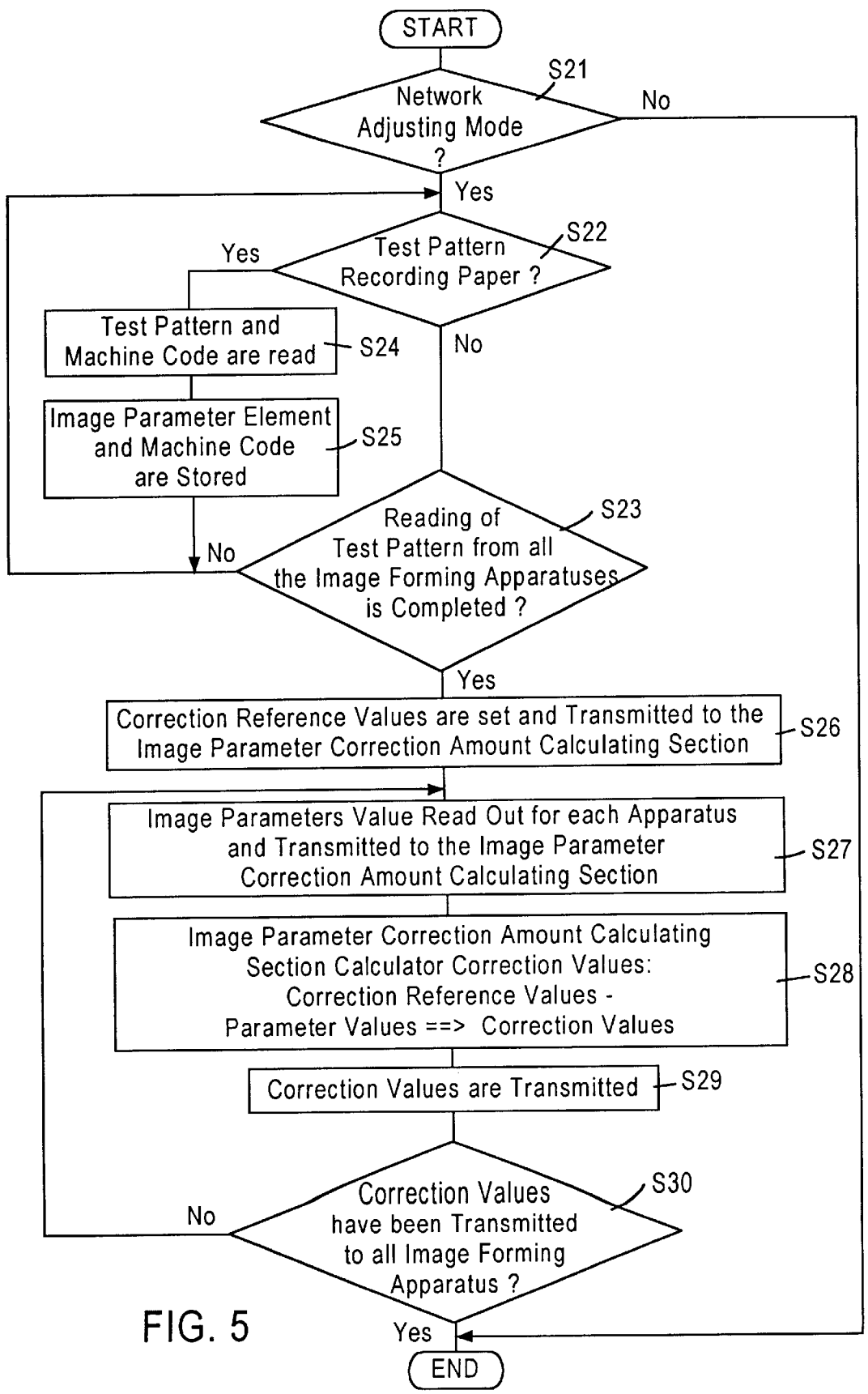
FIG. 5 is a flowchart illustrating a correction value calculation operation of an image forming apparatus of FIG. 1.

FIGS. 3 to 5 are flowcharts illustrating the operation of the image forming apparatuses 1. First, FIG. 3 illustrates the mode change and test pattern print signal generation operations. The user (i.e., the network administrator) selects one of the image forming apparatuses 1 as an image parameter correction reference machine, and enters a mode change command to initiate a network image adjusting mode for the adjustment of image forming quality. The mode operation section 17 accepts the mode change command, and outputs a mode change operation signal. The image forming apparatus 1 whose mode is changed to the network image adjusting mode is thus set as the image parameter correction reference machine, which outputs test pattern output instruction information to the other image forming apparatuses 1.

As illustrated in FIG. 3, the mode operation section 17 first determines whether the mode change operation has been initiated (S1). If the mode change operation has not been initiated, then the process is terminated. Otherwise, if the mode change operation has been initiated, then the mode for that particular image forming apparatus 1 is set to the network image adjusting mode (S2), and that apparatus serves as the image parameter correction reference machine.

Next, the image parameter correction reference machine broadcasts test pattern output instruction information from its information transmit/receive section 15 to the other image forming apparatuses 1 connected on the network (S4). Concurrently, the CPU 10 of the image parameter correction reference machine outputs a test pattern print signal to its test pattern printing section 11 (S3). The test pattern printing section 11 of the image parameter correction reference machine then prints a test pattern, along with a machine code identifying the test pattern as originating from the image parameter correction reference machine, on recording paper and outputs the test pattern recording paper (FIG. 4, S13).

FIG. 4 is a flowchart illustrating the test pattern print and image parameter correction operations. First, each of the image formation apparatuses 1 determines whether its information transmit/receive section 15 has received any information from the image parameter correction reference machine (S11). If no information has been received, then the process is terminated. Otherwise, if information has been received, then it determines whether the information comprises test pattern print instruction information (S12). If the information comprises test pattern print instruction information, then the CPU 10 outputs a test pattern print signal to the test pattern printing section 11. The test pattern printing section 11 then prints a test pattern, along with a machine code identifying the particular apparatus 1 that printed the test pattern, on recording paper and outputs the test pattern recording paper (S13).

If the information is not the test pattern print instruction information, then the apparatus 1 determines whether it comprises image parameter correction information (S14). If the information comprises image parameter correction information, the CPU 10 sends the information to the image parameter setting section 16, and the image parameter setting section 16 corrects the image parameters in accordance with the supplied parameter correction information (S15). The quality of images output by the various image forming apparatuses 1 connected to the network is thereby made equal to the quality of images output by the image parameter correction reference machine.

Otherwise, if the information is neither the test pattern print instruction information, nor the image parameter correction information, then the process is terminated.

FIG. 5 illustrates the correction value calculation operation. The network administrator collects the test pattern recording paper printed out by each of the image formation apparatuses 1 in step S13 (FIG. 4), including the test pattern recording paper printed by the image parameter correction reference machine, and inserts them into the test pattern reading section 12 of the image parameter correction reference machine. The test pattern recording paper is then processed in accordance with the following procedure to calculate the image parameter correction values for the other image forming apparatuses 1, and transmit the calculated correction values to each of the other image forming apparatuses 1.

First, the image parameter correction reference machine determines whether it is in the network image adjusting mode (S21). If it is not in the network image adjusting mode, then the process is terminated. Otherwise, if it is in the network image adjusting mode, then the image parameter correction reference machine determines whether test pattern recording paper has been inserted into its test pattern reading section 12 (S22). If test pattern recording paper has been inserted into the test pattern reading section 12, the test pattern and machine code printed on the recording paper is read by the scanner (S24). The image parameter extracting section 13 then extracts the image parameters (i.e., image density, etc.) from the scanned test pattern, and stores the parameters along with the machine code information identifying the corresponding image apparatus 1 from which the test pattern originated (S25).

The image parameter correction reference machine then determines whether more test pattern recording paper has been inserted into its test pattern reading section 12. If no other test pattern recording paper has been inserted into the test pattern reading section 12, then the image parameter correction reference machine determines whether test pattern recording papers from each of the image forming apparatuses 1 has been read (S23). If the test patterns from all image forming apparatuses 1 have not been read, then the process returns to S22.

Otherwise, once the image parameter correction reference machine determines that the test patterns from all the image forming apparatuses 1 have been read, the CPU 10 sets the image parameters extracted from the test pattern of the image correction reference machine as the correction reference values, and transmits these correction reference values to the image parameter correction calculating section for correcting the image quality of the other image forming apparatuses 1 (S26). Then, for each of the other image forming apparatuses 1, the CPU reads out the image parameters extracted from the corresponding test pattern, and transmits the image parameters to the image parameter correction calculating section (S27). The image parameter correction calculating section determines the differences between the correction reference values and the image parameters for each of the other image forming apparatuses 1, and stores a corresponding set of calculated results as the correction values for each such apparatus (S28). Each set of correction values is transmitted by the information transmit/receive section 15 of the image parameter correction reference machine to the information transmit/receive section 15 of the corresponding image forming apparatus 1 (S29). Each of the other image forming apparatuses 1 then corrects its internal image parameters accordingly (FIG. 4, S15).

Next, the image parameter correction reference machine determines whether the correction values have been transmitted to all the image forming apparatuses 1 (S30), and, if any correction values remain to be transmitted, then the process returns to S27. Once the corresponding set of correction values has been transmitted to each of the image forming apparatuses 1, the process is terminated.

As described above, the image forming apparatus 1 of the present invention is capable of: (1) reading the test pattern recording paper printed by each of the image forming apparatuses 1 connected on the network, including its own; (2) automatically calculating the image parameter correction values necessary to match the image quality of each of the other image forming apparatuses 1 with its own image quality; (3) transmitting the corresponding image parameter correction values to each of the other image forming apparatuses 1; and (4) automatically correcting its image parameters based on received image parameter correction values. Uniform image quality can thereby be easily accomplished between the images formed by each of the plurality of image forming apparatuses 1 of the present invention.

The present invention is not limited by any maximum or minimum number of image forming apparatuses 1 connected to the network. Further, in the present invention, each of the image forming apparatuses 1 itself is capable of functioning as the image parameter correction reference machine for calculating the correction values for each of the other image forming apparatuses 1 of the network.

Alternatively, the image parameter correction apparatus may comprise a personal computer and attached scanner. The personal computer performs the functions of the image parameter correction reference machine, as detailed above, except that it does not print its own test pattern. Instead, the personal computer outputs predetermined test pattern output instruction information to each image forming apparatus 1, and compares the image parameters extracted from the test pattern of each of the image forming apparatuses 1 with target image parameter information. The personal computer then sends a set of resulting image parameter correction values to the corresponding image forming apparatuses for uniform image parameter correction.

Of course, it should be understood that a wide range of modifications can be made to the exemplary embodiments described above. It is therefore intended that the foregoing detailed description be regarded as illustrative rather than limiting, and that it be understood that it is the following claims, including all equivalents, which are intended to define the scope of this invention.

I claim:

1. An image parameter correction apparatus for correcting at least one image parameter for each of a plurality of image forming apparatuses, comprising:

an image reading section for reading a prescribed image formed by each image forming apparatus;

a correction value calculating means for calculating at least one image parameter correction value corresponding with each image forming apparatus, the at least one image parameter correction value for each image forming apparatus being calculated by comparing the prescribed image from the corresponding image forming apparatus with a reference image; and a transmit section for transmitting the at least one image parameter correction value for each image forming apparatus to the corresponding image forming apparatus, wherein one of the image forming apparatuses forms the reference image.

2. The image parameter correction apparatus according to claim 1, further comprising an image parameter extracting section, wherein:

the image parameter extracting section extracts the at least one image parameter for each image forming apparatus from the prescribed image of the corresponding image forming apparatus; and the correction value calculating means calculates the at least one image parameter correction value for each image forming apparatus by comparing the at least one image parameter for the corresponding image forming apparatus with at least one reference image parameter.

3. The image parameter correction apparatus according to claim 2, wherein the image parameter extracting section extracts the at least one reference image parameter from the reference image.

4. The image parameter correction apparatus according to claim 1, wherein the at least one image parameter correction value for each image forming apparatus is provided for adjusting each image forming apparatus to produce images of a uniform quality.

5. A network having a plurality of image forming apparatuses networked together, wherein one of said image forming apparatuses cooperates in a mode as an image parameter correction apparatus for correcting at least one image parameter for each image forming apparatus, aid image parameter correction apparatus comprising:

an image reading section for reading a prescribed image formed by each image forming apparatus;

a correction value calculating means for calculating at least one image parameter correction value corresponding with each image forming apparatus, the at least one image parameter correction value for each image forming apparatus being calculated by comparing the prescribed image from the corresponding image forming apparatus with reference image; and a transmit section for transmitting the at least one image parameter correction value for each image forming apparatus to the corresponding image forming apparatus, wherein one of the image forming apparatuses forms the reference image.

6. The network according to claim 5, wherein the image parameter correction apparatus further comprises an image parameter extracting section, wherein:

the image parameter extracting section extracts the at least one image parameter for each image forming apparatus from the prescribed image of the corresponding image forming apparatus; and the correction value calculating means calculates the at least one image parameter correction value for each image forming apparatus by comparing the at least one image parameter for the corresponding image forming apparatus with at least one reference image parameter.

7. The network according to claim 6, wherein the image parameter extracting section extracts the at least one reference image parameter from the reference image.

8. The network according to claim 5, wherein the at least one image parameter correction value for each image forming apparatus is provided for adjusting each image forming apparatus to produce images of a uniform quality.

9. A method for correcting at least one image parameter for each of a plurality of image forming apparatuses networked together, said method comprising the steps of:

each image forming apparatus forming a prescribed image on a sheet of print media;

the scanning of each prescribed image by an image reader of one of the image forming apparatuses, operating in a mode as an image parameter correction apparatus;

the image parameter correction apparatus calculating at least one image parameter correction value for each image forming apparatus by comparing the prescribed image from the corresponding image forming apparatus with a reference image; and the image parameter correction apparatus transmitting the at least one image parameter correction value for each image forming apparatus to the corresponding image forming apparatus, wherein the reference image comprises the prescribed image formed by the image parameter correction apparatus.

10. The method according to claim 9, further comprising the step of, after scanning the prescribed images, the image parameter correction apparatus extracting the at least one image parameter for each image forming apparatus from the prescribed image of the corresponding image forming apparatus; and, wherein the at least one image parameter correction value for each image forming apparatus is calculated by comparing the at least one image parameter for the corresponding image forming apparatus with at least one reference image parameter.

11. The method according to claim 10, wherein the at least one reference image parameter is extracted from the reference image.

* * * * *